Dec. 25, 1962 V. V. POUPITCH 3,070,310

COMPUTING DEVICE

Filed Feb. 12, 1957 6 Sheets-Sheet 1

VERNET V. POUPITCH,
*INVENTOR.*

BY Gerald H. Peterson

ATTORNEY.

Dec. 25, 1962 V. V. POUPITCH 3,070,310

COMPUTING DEVICE

Filed Feb. 12, 1957 6 Sheets-Sheet 2

VERNET V. POUPITCH,
*INVENTOR.*

BY Gerald H. Peterson

ATTORNEY.

Dec. 25, 1962 V. V. POUPITCH 3,070,310

COMPUTING DEVICE

Filed Feb. 12, 1957 6 Sheets-Sheet 3

VERNET V. POUPITCH,
INVENTOR.

BY Gerald H. Peterson

ATTORNEY.

Dec. 25, 1962 V. V. POUPITCH 3,070,310

COMPUTING DEVICE

Filed Feb. 12, 1957 6 Sheets-Sheet 4

VERNET V. POUPITCH,
INVENTOR.

BY Gerald H. Peterson

ATTORNEY.

Dec. 25, 1962 V. V. POUPITCH 3,070,310

COMPUTING DEVICE

Filed Feb. 12, 1957 6 Sheets-Sheet 5

VERNET V. POUPITCH,
*INVENTOR.*

BY [signature]

ATTORNEY.

VERNET V. POUPITCH,
*INVENTOR.*

BY Gerald H. Peterson
ATTORNEY.

United States Patent Office 3,070,310
Patented Dec. 25, 1962

3,070,310

COMPUTING DEVICE

Vernet V. Poupitch, Los Angeles, Calif.
(4731 Deseret Drive, Woodland Hills, Calif.)
Filed Feb. 12, 1957, Ser. No. 639,692
3 Claims. (Cl. 235—195)

This invention relates to a device for performing the operations of multiplication and division. Many such devices have been manufactured in the past, but all have suffered from various drawbacks, such as complexity, high cost, etc.

In accordance with my invention, I have discovered a computing device which is relatively simple to build, easy to operate, and which embodies a new principle of operation. To explain the principle of my invention five electromechanical embodiments will be described herein as examples, along with the accompanying drawings in which.

Figure 1:
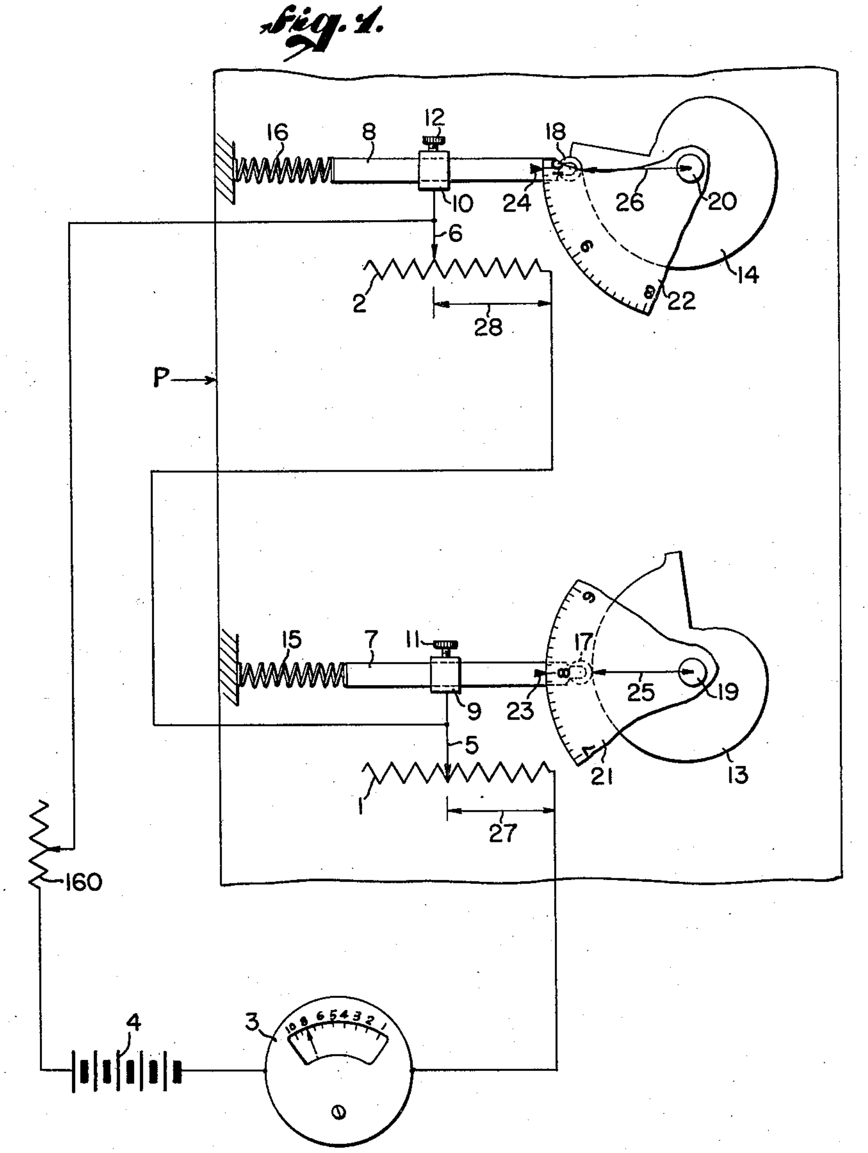
FIG. 1 shows one embodiment of my invention designed to multiply two numbers together.

FIG. 1 shows an embodiment of my invention which is designed to multiply two numbers together. The electrical circuit consists of two variable resistors, 1 and 2, wired in series with each other and also in series with the current indicator 3, D.C. voltage source 4 and scale adjusting resistor 160. Both variable resistances are linear, i.e. they are constructed so that a displacement of the pickoff 5 or 6 results in a change of resistance which is directly proportional to the distance traveled by the pickoff. Both resistors have the same resistance range and gradient. The pickoffs 5 and 6 are adujstably mounted on rods 7 and 8 by means of sleeves 9 and 10. Sleeves 9 and 10 are free to slide back and fourth on rods 7 and 8; but can be rigidly fixed at any desired point on the rods by means of set screws 11 and 12. The rods 7 and 8 are held pressed against cams 13 and 14 by means of springs 15 and 16. Small contact rollers 17 and 18 are mounted on the ends of rods 7 and 8 to permit the cams 13 and 14 to rotate freely.

The position of the pickoffs 5 and 6 depends on the initial sleeve adjustment and the shape and angular position of the cams 13 and 14. Cams 13 and 14 are rigidly mounted on cam shafts 19 and 20 which are rotatable in journals on mounting plate P. Also rigidly attached to the cam shafts 19 and 20 are dials 21 and 22. The dials are divided into numbers from one to ten at equally spaced intervals reading clockwise around the dial, with indices 23 and 24 provided to read the numbers on the dials. Indices 23 and 24 do not rotate with the dials 21 and 22, but are marked on some fixed surface, such as on the mounting plate P, closely adjacent to the dials 21 and 22. However, cams 13 and 14 do rotate with dials 21 and 22 respectively, since they are both rigidly fixed to the cam shafts 19 and 20. Cam shafts 19 and 20 rotate independently from each other.

Figure 2:
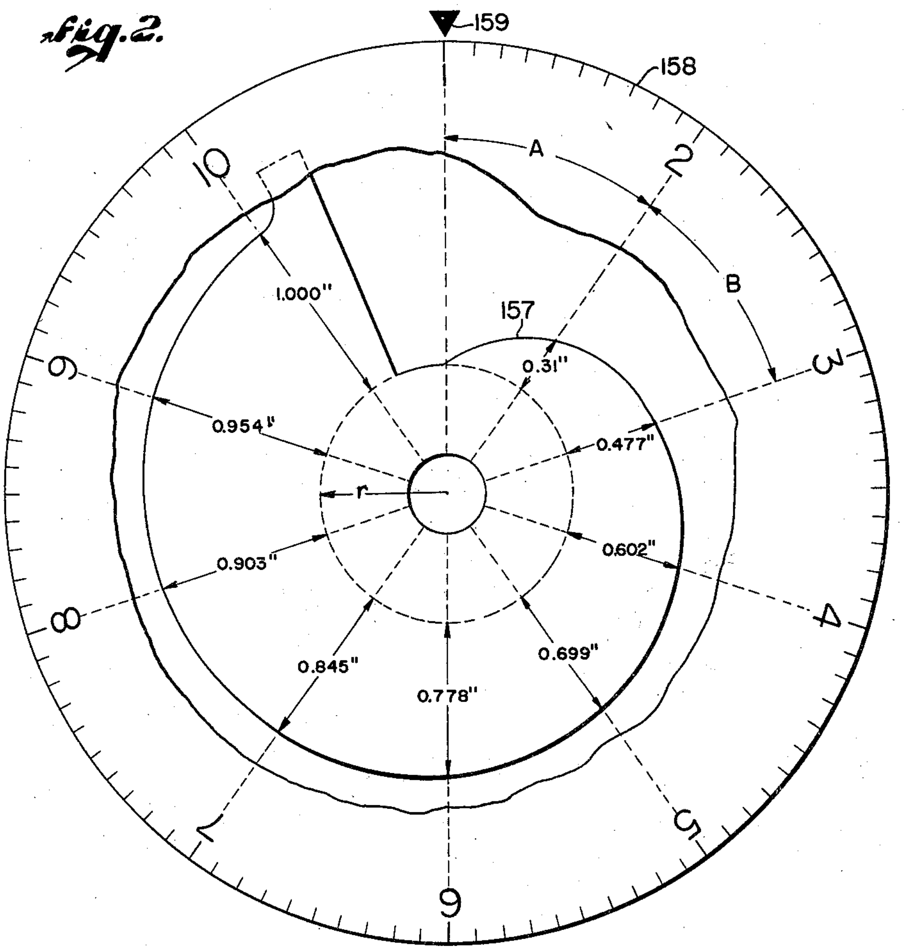
FIG. 2 shows the detailed structure of the cam assembly disclosed in FIG. 1.

FIGURE 2 shows the detailed structure of cam 157 and its corresponding dial 158. The cam 157 is shaped so that the distance from the reference circle of radius $r$ to the outer edge of the cam will be equal to the logarithm of the number appearing under the index marker 159 on the dial 158. It should be understood that both the cam 157 and the dial 158 are rigidly attached to a common shaft which passes through the hole shown in the cam, so that the dial and cam shaft rotate together. The specific dimensions of the cam are shown on FIG. 2 at intervals around the dial. The angular distance A from the number 1 to the number 2 is equal to the angular distance B from 2 to 3, and so on around the dial, the numbers are equally spaced.

Cams 13 and 14 are shaped so that the distance from the roller contacts 17 and 18 to the respective cam shafts 19 and 20 will always be proportional to the logarithm of the number appearing on the dials 21 and 22 directly under the indices 23 and 24, as shown in FIG. 2. Since the pickoffs 5 and 6 are positioned by the cams 13 and 14, then the position of the pickoffs 5 and 6 will also be proportional to the logarithm of the numbers appearing on the dials 21 and 22 under the indices 23 and 24. And, since the amount of resistance contributed to the circuit by the variable resistors (27 and 28) varies directly with the position of the pickoffs 5 and 6, the resistances 27 and 28 will also be proportional to the logarithm of the numbers appearing on the dials 21 and 22 under the indies 23 and 24.

According to the laws of electricity, the total resistance of two resistors connected in series is equal to the sum of their separate resistances. Therefore the total resistance contributed by the variable resistors in the circuit of FIG. 1 is equal to 27 plus 28, and since 27 and 28 are respectively proportional to the logarithms of the numbers set on dials 21 and 22 under the indices 23 and 24, the total resistance contributed to the circuit by the variable elements will be proportional to the sum of these two logarithms. By Ohm's law, the current in a circuit is inversely proportional to the total resistance in the circuit if voltage is constant. Therefore, if the constant resistances are small, the current in this circuit will be approximately inversely proportional to the sum of the logarithms of the numbers set to the indices on the dials. The current indicator 3 is calibrated to read the inverse of the anti-logarithm of the current flowing through it. By the laws of mathematics the anti-logarithm of the sum of two logarithms is equal to the product of the two numbers. Therefore the reading on the face of the current indicator will be equal to the product of the two numbers set on the dials 21 and 22 under the indices 23 and 24.

The process of multiplication with this device reduces to the simple procedure of setting the numbers to be multiplied on the two dials 23 and 24, and then reading their product directly on the current indicator. The initial calibration of the current indicator can be made by reversing this procedure. Numbers can be set on the dials 21 and 22, and then the position of the current indicator pointer can be marked as the known product of the numbers. After initial calibration, changes in the voltage source 4 may be compensated for by changing the variable resistor 160.

The D.C. voltage source is used here as an example, but it should be understood that any source of electromotive force could be used just as well if desired. In the case where an A.C. source is used, the current indicator 3 would have to be replaced with an A.C. current indicator, but all other parts of the circuit could remain the same.

For a concrete example of the operation of this circuit, suppose it is desired to multiply the number 8 by the number 10. The operator would then turn one of the dials so that the number 8 appeared under the index, and the other dial so that the number 10 appeared under the index. In FIG. 1 dial A is shown set on 10 and dial B on 8, but the numbers could be reversed without affecting the circuit operation. It is immaterial which dial is used for the numbers so long as each number appears on a dial. Because of the shape of cam 13 the distance 25 will be the logarithm of 8+the radius $r$ of the cam reference circle. The effect of this radius $r$ is removed in the initial calibration by setting resistance 27 to zero when distance 25 is equal to $r$. And, since the pickoff 5 is positioned according to the distance 25, then the resistance 27 ($R_1$) will be equal to some constant C times the distance from the cam reference circle to the roller. By the same reasoning, the distance 26 will be equal to the logarithm of 10+the radius $r$. The effect of the radius $r$ is also removed from resistance 28 by initial adjustment of the sleeve 10. Then the resistance 28 ($R_2$) is equal to the constant C times the distance from the cam reference circle $r$ to the roller. And total resistance in the circuit is equal to the sum of $R_1$, $R_2$, and the constant circuit resistance. The variable resistors are constructed with the same resistance range and gradient, so that their constants are the same. The total resistance is then $$R_T=C(\log 8+\log 10)+\text{constant circuit resistance } (K)$$

or $$R_T=R_1+R_2+K$$

Then, by Ohm's law, the current in the circuit is equal to voltage divided by the total resistance.

$$I=\frac{E}{R_1+R_2+K}$$

In accordance with the invention the value of the circuit resistance K is made to be as small as practicable, particularly with respect to the value of $R_1$ and $R_2$. It will be understood, of course, that the effect of the circuit resistance K cannot be eliminated in such a way as to make the current in the circuit vary only with the sum of the logarithms, particularly when the sum of $R_1$ and $R_2$ is small, but with the arrangement here described, the effect of the circuit resistance can be eliminated in use by a calibration of the scale on current indicator 3 with respect to settings on dials 21 and 22. The scale on indicator 3 carries numbers from 1 through 10 as on a well-known slide rule. This scale is made by setting dials 21 and 22 both on 1 and marking the point 1 on the scale of indicator 3 in accordance with the position of its pointer, which in this arrangement corresponds to the maximum value of the current in the circuit, giving the result of multiplying 1 times 1, which is 1. Dials 21 and 22 are then both set at 10 and the pointer of indicator 3 will then move to its maximum position to the left of 1, corresponding to the minimum value of the current, and this position is marked 10 on the scale, also as on a slide rule, where the result is given without regard to the decimal point. For known products the numbers 2, 3, 4, 5, 6, 7, 8 and 9, and any number of values therebetween can also be located on the scale of indicator 3 from settings on dials 21 and 22, which give products corresponding to these numbers. For example, 9 will be obtained by setting dials 21 and 22 at the number 3, 6 may be obtained by setting dial 21 at 2 and dial 22 at 3, and so forth. With this arrangement and with this calibration, dials 21 and 22 may be set to multiply any two numbers, as on a slide rule, and the result of a product may be read on the scale of indicator 3, also as on a slide rule. It will be understood that the setting on dials 21 and 22 and the reading on the scale of indicator 3 will be as on a slide rule with respect to the matter of significant figures of the numbers multiplied and the product concerned. It will also be understood that the scale on indicator 3 resulting from the arrangement and calibration described will not be exactly linear, but, with careful calibration, will provide a scale useful for reading the product of the numbers set on dials 21 and 22 for a very useful number of significant figures in a manner somewhat similar to a slide rule.

Figure 3:
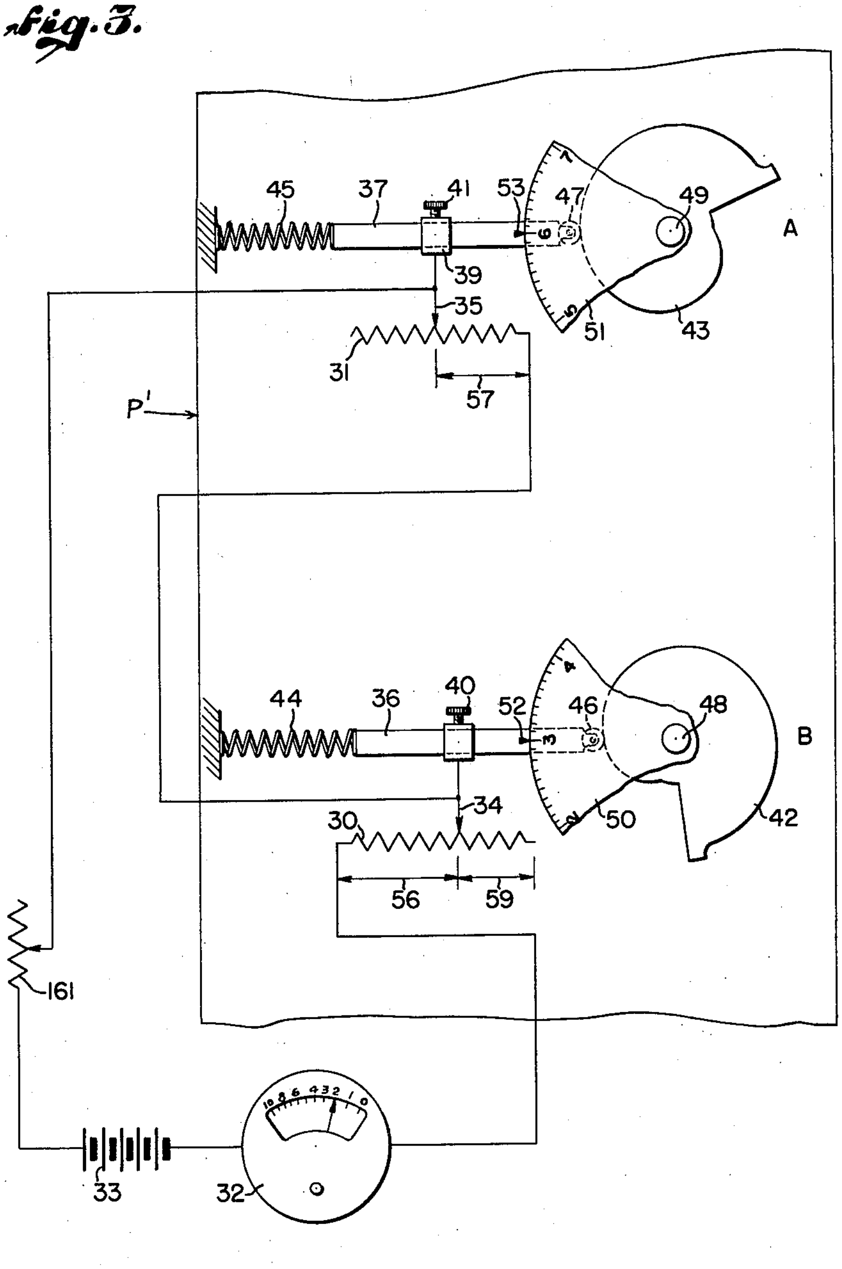
FIG. 3 shows a second embodiment of my invention designed to divide one number by another.

FIGURE 3 shows a second embodiment of my invention which is designed to divide one number by another. The electrical circuit consists of two variable resistors, 30 and 31, wired in series with each other, and also in series with the current indicator 32, D.C. voltage source 33, and scale adjustment resistor 161. Both variable resistors are linear, i.e. they are constructed so that a displacement of the pickoff 34 or 35 results in a change of resistance which is directly proportional to the distance traveled by the pickoff. Both resistances have the same resistance range and gradient. The pickoffs 34 and 35 are adjustably mounted on rods 36 and 37 by means of sleeves 38 and 39. Sleeves 38 and 39 are free to slide back and forth on rods 36 and 37; but can be rigidly fixed at any point on the rods by means of set screws 40 and 41. The rods 36 and 37 are held pressed against cams 42 and 43 by means of springs 44 and 45. Small contact rollers 46 and 47 are mounted on the end of rods 36 and 37 to permit the cams 42 and 43 to rotate freely. Thus the position of the pickoffs 34 and 35 depends on the initial sleeve adjustment and the shape and angular position of the cams 42 and 43. Cams 42 and 43 are rigidly mounted on cam shafts 48 and 49 which rotate in journals on plate P'. Also rigidly attached to the cam shafts 48 and 49 are dials 50 and 51. The dials are divided into numbers from one to ten at equally spaced intervals reading clockwise around the dials. Indices 52 and 53 are provided to read the number on the dials. Indices 52 and 53 do not rotate with the dials 50 and 51, but are marked on some fixed surface, such as mounting plate P', closely adjacent to the dials 50 and 51. However, cams 42 and 43 do rotate with dials 50 and 51 respectively, since they are both rigidly fixed to the cam shafts 48 and 49. Cam shafts 48 and 49 rotate independently from each other. Cams 42 and 43 are shaped so that the distance from the roller contacts 46 and 47 to the respective cam shafts 48 and 49 will always be proportional to the logarithm of the number appearing on the dials 50 and 51 under the indices 52 and 53, as shown in FIG. 2. Since the pickoffs 34 and 35 are positioned by the cams 42 and 43, then the position of the pickoffs 34 and 35 will also be proportional to the logarithm of the numbers appearing on the dials 50 and 51 under the indices 52 and 53. And, since the amount of resistance contributed to the circuit by each potentiometer (56 and 57) varies directly with the position of the pickoffs 34 and 35, the amount of resistance in the circuit (56 and 57) contributed by these resistors will also be proportional to the logarithm of the numbers appearing on the dials 50 and 51 under the indices 52 and 53.

This circuit shown in FIGURE 3 differs from the circuit of FIGURE 1 only in having the output connection of potentiometer B taken from the opposite end. This small difference, however, accounts for the difference in operation of the two circuits. The circuit of FIGURE 1 multiplied two numbers together, whereas the circuit of FIGURE 3 divides one number by the other. To clearly understand how division is accomplished by the circuit of FIGURE 3, we will first examine the circuit conditions when both dials are set on 1, which is the smallest number that can be set on either dial.

With dials 50 and 51 both set on the smallest number, i.e. 1, the pickoffs 34 and 35 will both be at their maximum excursion to the right, as shown on FIGURE 3. Therefore, the values of the resistances 57 and 59 will be at a minimum. In potentiometer 31 this will mean that the resistance contributed to the circuit will be at a minimum. But in variable resistor 30 this will mean that the resistance it contributes to the circuit will be at a maximum, since variable resistor 30 is connected inversely from variable resistor 31. Then increasing the reading on dial 51 under the index 53 will increase the resistance in the circuit according to the logarithm of the number set on the dial; but increasing the reading on dial 50 under the index 52 will result in a decrease of the circuit resistance according to the logarithm of the number set on dial 50. Therefore the total change in circuit resistance from the initial conditions will be proportional to the logarithm of the number on dial A minus the logarithm of the number on dial B. By the laws of mathematics the logarithm of A minus the logarithm of B is equal to the logarithm of A divided by B $$\log A - \log B = \log(A/B)$$

For a concrete example of the operation of this circuit, suppose it is desired to divide the number 6 by the number 3. The operator would set the dividend 6 on the dial A and the divisor 3 on the dial B. In this circuit it is critical that the dividend be set on dial A and the divisor on dial B, for reasons which will become apparent after the description of the circuit operation. Reversing the order of the numbers would result in dividing 3 by 6, rather than dividing 6 by 3.

Turning the dial A to 6 increases the circuit resistance by $C \log 6$, where C is the constant of the variable resistor A. Turning the dial B to 3 decreases the circuit resistance by $C \log 3$. Therefore, the total change in circuit resistance from the initial conditions will be $$\Delta R = C \log 6 - C \log 3$$

and since the constants C are equal for both resistors $$\Delta R = C\ (\log 6 - \log 3) = C \log \frac{6}{3} = C \log 2$$

The current in the circuit will then be a function of $C \log 2$, and by proper calibration the dial will read 2, which is the quotient of 6 divided by 3. The initial calibration also serves to counteract the effect of the constant circuit resistances on the scale reading.

To calibrate this embodiment, numbers are set on the dials 50 and 51, and the position of the needle on the scale is then marked to read the known quotient of the numbers set on the dials. For example, a 1 may be set on dial 51 and a 10 on dial 50. Then the position of the needle on the scale is marked to read 0.1. This establishes the lower end of the scale. The upper end of the scale is marked by setting a 10 on dial 51 and a 1 on dial 50, and marking the position of the needle on the scale to read 10. Then as many other points can be marked as are necessary for accurate calibration of the dial.

Figure 4:
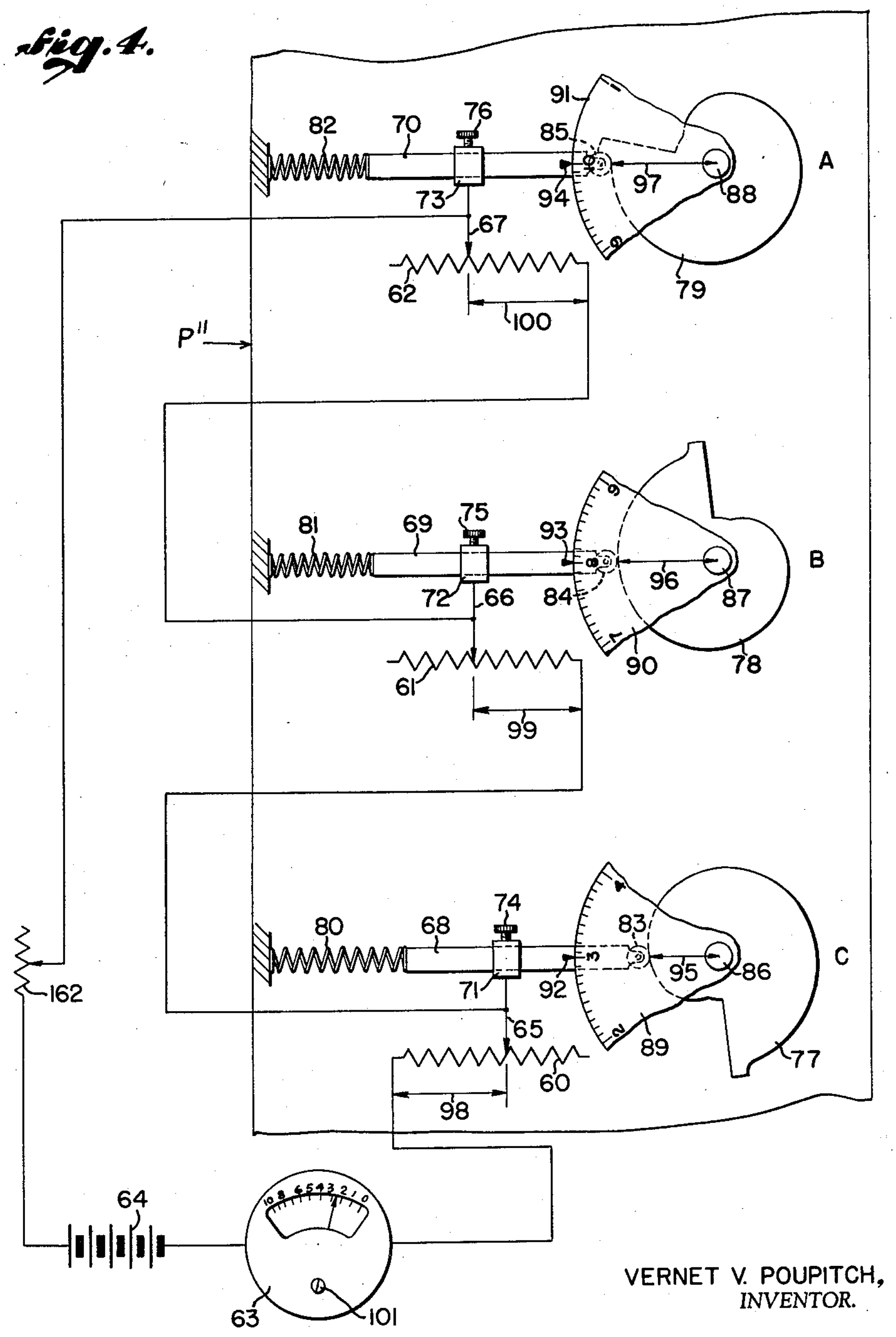
FIG. 4 shows a third embodiment of my invention designed to multiply one number by another and divide that product by a third number.

FIGURE 4 shows a third embodiment of my invention which is designed to multiply two numbers together, or divide one number by another, or to multiply two numbers together and divide their product by a third number. The electrical circuit consists of three variable resistors, 60, 61 and 62, wired in series with each other and also in series with an ammeter 63, a D.C. voltage source 64, and scale adjustment resistor 162. All three variable resistors are linear, i.e. they are constructed so that a displacement of the pickoffs 65, 66, or 67 will result in a change of resistance which is directly proportional to the distance traveled by the pickoff. All three variable resistors have the same resistance range and gradient. The pickoffs 65, 66, and 67 are adjustably mounted on rods 68, 69 and 70 by means of sleeves 71, 72, and 73. Sleeves 71, 72, and 73 are free to slide back and forth on rods 68, 69, and 70; but can be rigidly fixed at any desired point on the rods by means of set screws 74, 75, and 76. The rods 68, 69, and 70 are held pressed against the cams 77, 78, and 79 by means of springs 80, 81, and 82. Small contact rollers 83, 84, and 85 are mounted on the ends of rods 68, 69 and 70 to permit the cams 77, 78, and 79 to rotate freely. Thus the position of the pickoffs 65, 66, and 67 depends on the initial sleeve adjustment and the shape and angular position of the cams 77, 78, and 79. Cams 77, 78, and 79 are rigidly mounted on cam shafts 86, 87, and 88 which rotate in journals on plate P″. Also rigidly attached to the cam shafts 86, 87 and 88 are the dials 89, 90, and 91. The dials are divided into numbers from one to ten at equally spaced intervals reading clockwise around the dials. Indices 92, 93, and 94 are provided to read the angular position of the dials. The indices do not rotate with the dials, but are marked on some fixed surface, such as the surface of mounting plate P″ adjacent to their respective dials. However, the cams 77, 78, and 79 do rotate with their respective dials 89, 90, and 91; since both the cams and dials are rigidly attached to the same cam shaft. Cam shafts 86, 87, and 88 rotate independently from each other. The cams are shaped so that the distance from their respective contact roller to their respective cam shaft (95, 96, and 97) will always be proportional to the logarithm of the number appearing on the dials under the index as shown in FIGURE 2. Since the pickoffs are positioned by their respective cams, the position of the pickoffs will also be proportional to the logarithm of the number appearing on their respective dial under the index mark. And, since the amount of resistance in the circuit contributed by each varies directly with the position of the pickoff, then the resistance contributed by each (98, 99, and 100) will also be proportional to the logarithm of the number of each dial.

Variable resistors 61 and 62 are wired so that an increase in the reading on their respective dials will result in an increase in the resistance that they contribute to the total circuit. But variable resistor 60 is wired so that an increase in the reading on its dial will result in a corresponding decrease in the amount of resistance that it contributes to the circuit. So, if the initial resistance in the circuit with dials A′, B′, and C′ set at one is equal to the value $R_1$, then the total circuit resistance for the example shown in FIGURE 3 will be equal to $R_1$ plus some constant C times the logarithm of 10 plus some constant C times the logarithm of 8 minus some constant C times the logarithm of 3

$$R_t = R_1 + C(\log 10) + C(\log 8) - C(\log 3)$$

appearing on their respective dial under the index mark. And, since the amount of resistance in the circuit contributed by each varies directly with the position of the pickoff, then the resistance contributed by each (98, 99, and 100) will also be proportional to the logarithm of the number on each dial.

Variable resistors 61 and 62 are wired so that an increase in the reading on their respective dials will result in an increase in the resistance that they contribute to the total circuit. But variable resistor 60 is wired so that an increase in the reading on its dial will result in a corresponding decrease in the amount of resistance that it contributes to the circuit. So, if the initial resistance in the circuit with dials A′, B′, and C′ set at one is equal to the value $R_1$, then the total circuit resistance for the example shown in FIGURE 3 will be equal to $R_1$ plus some constant C times the logarithm of 10 plus some constant C times the logarithm of 8 minus some constant C times the logarithm of 3

$$R_t = R_1 + C(\log 10) + C(\log 8) - C(\log 3)$$

Since the constants for each of the assemblies A′, B′, and C′ are equal, this expression can be re-written as $$R_t = R_1 + C(\log 10 + \log 8 - \log 3)$$

By the laws of mathematics $$\log 10 + \log 8 - \log 3 = \log \left(\frac{8 \times 10}{3}\right)$$

The current in the circuit will then be approximately inversely proportional to $$\log \left(\frac{8 \times 10}{3}\right)$$

and the current indicator, which is calibrated to read the inverse of the anti-logarithm of the current, will indicate the value of $$\left(\frac{8\times 10}{3}\right)$$

which is 26.666—. The constants in the equations will be adjusted for in the initial calibration and the initial setting of the variable resistor adjustments 71, 72, and 73; the current indicator zero adjustment 101, and the zero adjust resistance 162.

The operation of this device in multiplying two numbers is as follows: first the operator sets the dial C′ on 1, then he sets the two numbers to be multiplied on dials A′ and B′, and reads the product directly on the current indicator.

To divide one number by another, the operator sets the dividend on either dial A′ or B′, and then turns whichever dial he has not used to the value one. Then he sets the divisor on dial C′, and reads the quotient directly on the current indicator.

To multiply two numbers together and divide their product by a third number, the operator sets the two numbers to be multiplied on dials A′ and B′, and the number to be divided by on the dial C′. He then reads the result on the computation directly on the current indicator.

The effect of the constant circuit resistances on the scale reading is counteracted in the initial calibration of the device. To calibrate, numbers are set on dials A′, B′, and C′; then the position of the needle on the scale is marked to read the known product and/or quotient of the numbers set on the dials. For example, to mark the minimum point on the scale, dials A′ and B′ are set to 1, and dial C is set to 10. Then the position of the pointer on the scale is marked to read 0.1. To mark the maximum point on the scale dials A′ and B′ are set to 10 and dial C′ to 1. The position of the pointer on the scale is then marked to read 100. Then in the same manner as many other points may be marked as are necessary for accurate calibration of the scale.

It should be noted here that the device shown in FIG. 4 could be expanded to accommodate any desired number of multiplicands or divisors by simply increasing the number of variable resistor assemblies in the circuit. For each additional multiplicand, a variable resistor would have to be added which was connected like assemblies A′ and B′ in FIG. 4. For each additional divisor, a variable resistor assembly would be added which was connected like assembly C′ in FIG. 4.

Figure 5:
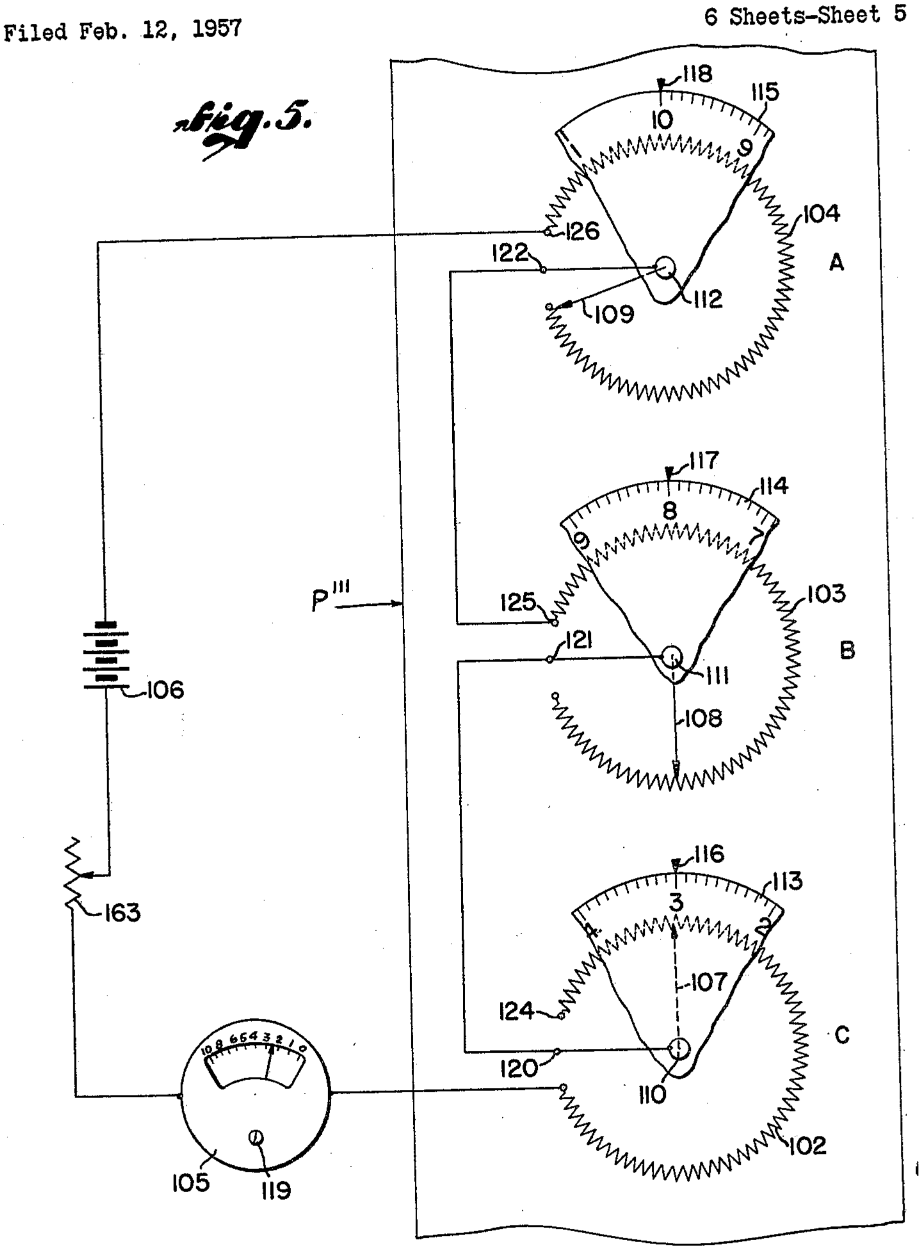
FIG. 5 shows a fourth a embodiment of my invention designed to multiply two numbers together and divide their product by a third number.

FIG. 5 shows a fourth embodiment of my invention which will perform the same functions as the embodiment shown in FIG. 4. However, this embodiment differs in having the logarithmic function wound into the variable resistors rather than being constructed into cams. The circuit consists of three variable resistors 102, 103, and 104 connected in series with each other and also in series with a current indicator 105 and a D.C. voltage source 106. All three variable resistors are logarithmically wound, i.e. they are constructed so that a displacement of the pickoffs 107, 108, or 109 will result in a change in resistance which is proportional to the logarithm of the angular displacement of the pickoff. All three variable resistors have the same resistance range and resistance change per degree variation in shaft angle. The pickoffs 107, 108, and 109 are rigidly mounted on shafts 110, 111, and 112 which may rotate in journals on plate P″. Rigidly mounted on the same shafts are dials 113, 114, and 115. The dials are divided into numbers from one to ten at equally spaced intervals reading counterclockwise around the dial, and indices 116, 117, and 118 are marked on some fixed surface such as mounting plate P‴, adjacent to the dials so that the angular position of the dials can be read. The variable resistors are constructed so that the resistance between the pickoff terminals 120, 121, and 122, and the respective upper terminals 124, 125, and 126, will be equal to some constant C times the logarithm of the number appearing under the index on their respective dials. Variable resistors A′ and B′ are connected so that an increase in their dial reading results in a corresponding increase in the circuit resistance, while variable resistor C′ is connected so that an increase in its dial reading will result in a corresponding decrease in the total circuit resistance. Because of the logarithmic winding of the variable resistors, their total contribution to the circuit resistance will then be proportional to the logarithm of the number appearing on dial A′ plus the logarithm of the number appearing on dial B′ minus the logarithm of the number appearing on the dial C′

$$R_t = C(\log A' + \log B' - \log C')$$

The current indicator 105 is calibrated to read the inverse of the anti-logarithm of the current, so the current indicator reading will be equal to A′ times B′ all divided by C′. In the example shown on FIG. 5 the current indicator would read 10 times 8 divided by 3, or 26.666—. This device can also be expanded to handle additional numbers by simply adding variable resistors. For each additional multiplier, the variable resistor would be connected like A′ and B′, and for each divisor the variable resistor would be connected like C. The initial adjustment in the circuit to cancel out the effects of the constants can be made by the initial calibration of the scale, and setting the initial position of the variable resistor pickoffs 107, 108, and 109; by adjusting the zero setting 119 on the ammeter, and by adjusting the zero adjust resistance 163.

Figure 6:
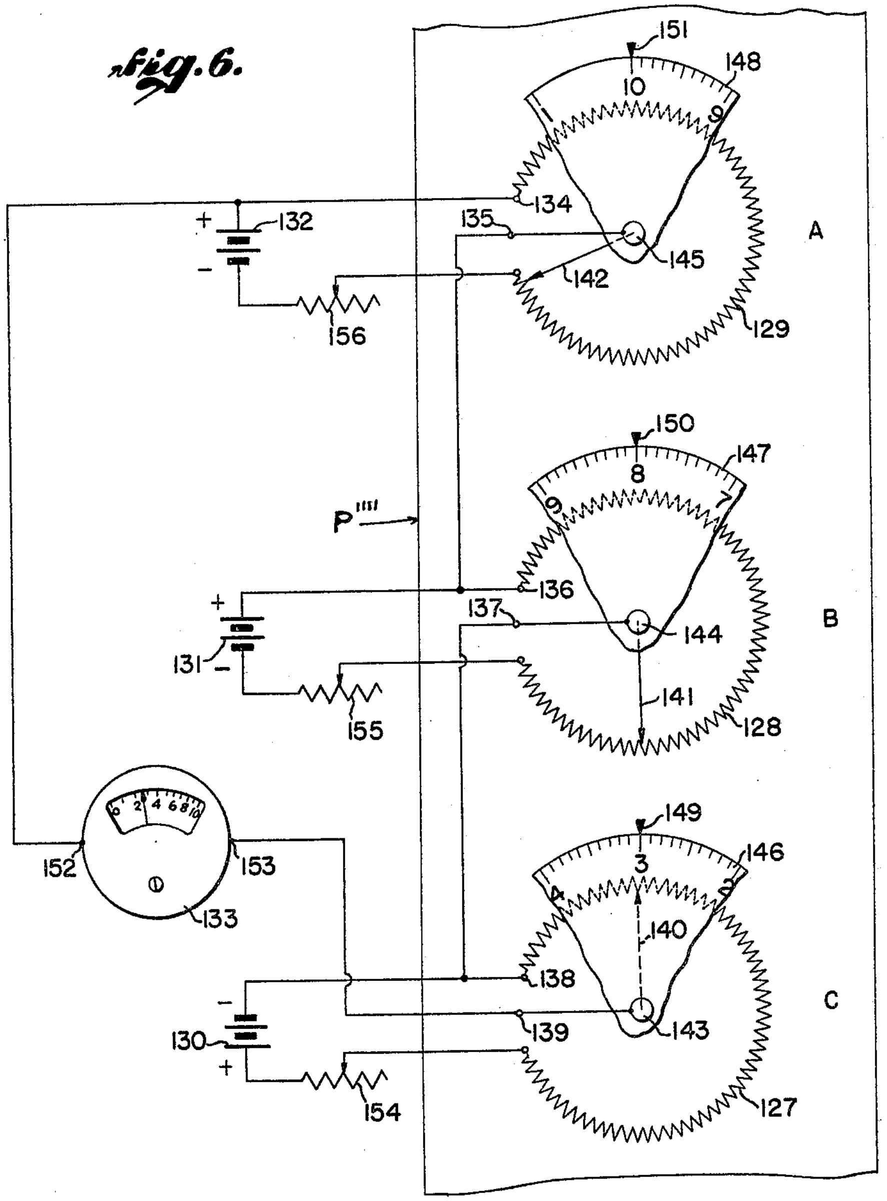
FIG. 6 shows the fifth embodiment of my invention designed to multiply two numbers together and divide their product by a third number.

FIG. 6 shows a fifth embodiment of my invention which can be used to either multiply two numbers together, or divide one number by another, or to multiply two numbers together and divide their product by a third number. The circuit consists of three variable resistors 127, 128, and 129 which each have a corresponding source of D.C. voltage 130, 131, and 132 connected across their full resistance. The voltage of 130, 131, and 132 are equal. Adjustable resistors 154, 155, and 156 are provided to further equalize the voltage appearing at the variable resistances. The three variable resistors are connected in a series arrangement which follows from voltmeter 133 terminal 152 to variable resistor 129 terminal 134 through the variable resistor 129 to the pickoff 142 to the terminal 135, then to variable resistor 128 terminal 136 through the variable resistor to the pickoff 141 to the terminal 137, then to variable resistor 127 terminal 138 through the variable resistor to pickoff 140 to the terminal 139, and then to the terminal 153 of the voltmeter 133.

All three variable resistors are logarithmically wound, i.e. they are constructed so that a displacement of the pickoffs 140, 141, or 142 will result in a change in resistance which is proportional to the logarithm of the angular displacement of the pickoff. All three variable resistors are constructed with the same resistance range and resistance variation per degree change in shaft angle. The pickoffs 140, 141, and 142 are rigidly mounted to shafts 143, 144, and 145 respectively, which shafts may rotate in journals on mounting plate P⁗. Rigidly mounted on the same shafts are dials 146, 147, and 148. The dials are divided into numbers from one to ten at equally spaced intervals reading counter-clockwise around the dials. Indices 149, 150, and 151 are marked on some fixed surface, such as mounting plate P⁗ adjacent to the dials so that the angular position of the dials can be read. The variable resistors are constructed so that the resistance between the pickoff terminals 135, 137, and 139 and the corresponding terminals 134, 136, and 138 will always be equal to some constant C times the logarithm of the number appearing under the index of their respective dials. By Ohm's law, the amount of voltage picked off a voltage divider will vary directly with the resistance, provided the current through the divider remains constant. Therefore the amount of voltage appearing between the pickoff terminals 135, 137, and 139 and the corresponding terminals 134, 136, and 138 will then be also a function of some constant times the logarithm of the number on the respective dial. The operation of the series circuit which includes the voltmeter 133 is to add these logarithmic voltages algebraically.

For an example of the circuit operation, suppose the numbers on the dials in FIG. 6 were set on the dials. Then, starting at terminal 153 on voltmeter 133 we will go around the series circuit and take the sum of the voltages. First, the voltage from terminals 134 to 135 on variable resistors will be equal to $+C$ log 10, where C is some constant determined by the value of the voltage of the source 132 and the constant C of the variable resistors. Then going to terminal 136 of variable resistor 128 we have a voltage of $+C$ log 8. The constant C is the same for each case, since the variable resistors are constructed to have the same constants, and the voltage across each individual resistor is adjusted to be equal by the adjustments 154, 155, 156. Then going to terminal 138 of variable resistor 127 we have a voltage equal to $-C$ log 3. The polarity of the voltage contributed by variable resistor 127 is reversed because the polarity of the source 130 is reversed from the other sources 131 and 132.

Then summing the voltages around the loop gives the total voltage that will be measured by the voltmeter $$Vt=C \log 10+C \log 8-C \log 3$$

Since the constant C is equal for each case, this expression can be rewritten as $$Vt=C(\log 10+\log 8-\log 3)$$

According to the laws of mathematics $$\log 10+\log 8-\log 3=\log \left(\frac{8\times 10}{3}\right)$$

Therefore, the final voltage in the circuit will be equal to the constant C times the logarithm of $$\frac{8\times 10}{3}$$

The voltmeter scale is calibrated to read the anti-logarithm of the voltage appearing at its terminals, so the reading of the voltmeter will indicate the answer to the computation. The constants in the circuit are compensated for in the initial adjustment of the circuit, as described for the first three embodiments.

In all of the circuits shown in FIGS. 1 through 6 the indicating device disclosed has been an ammeter; however it should be understood that an ohmmeter or voltmeter could be used just as well without changing the fundamental operation of the circuits. The minor changes required to adapt the circuits for these different indicating devices are well known to those skilled in the art. Also, the power source has been shown as a D.C. source in each case, but this could be changed to A.C. without affecting the fundamental operation of the circuits. In the case of an A.C. source, an A.C. indicating device would be used instead of a D.C. indicating device.

Also, other circuit elements could be added for ease of adjustment, or to present the readings on the current indicator's scale in a more convenient fashion. It may also prove desirable to use a digital current indicator rather than a pointer-scale current indicator for clarity of presentation in the reading. A digital current indicator presents current values as numbers which can be read directly, rather than as the position of a pointer on a calibrated scale. The digital ammeter also has the advantage of eliminating errors in reading due to parallax or mis-interpretation of scale markings. It may be convenient to use other means of setting in numbers rather than the calibrated circular discs I have shown here. However, all of these variations would simply be adaptations of my invention, and would not affect the fundamental operation of the circuit. My invention consists fundamentally in a device which performs multiplication or division or both by means of translating numbers into physical quantities which are proportional to the logarithms of the numbers, then adding the quantities algebraically in a series circuit, and reading the product or quotient or both directly from some visual indicating device.

I claim:

1. In a computing device for carrying out the mathematical operations of multiplication and division involving the algebraic addition of logarithms, the combination comprising means for setting in the numbers to be multiplied and/or divided; said setting in means comprising a mounting structure, a plurality of dials rotatably mounted thereon, said dials adapted to be rotated independently from each other and having numbers marked thereon at equally spaced intervals around the periphery thereof, and an index marking on said mounting structure adjacent to each dial; means for converting the set in numbers into electrical quantities whose values represent the logarithms of said numbers; said conversion means comprising a cam associated with each dial, means connecting said cams to their respective dials in such a manner that each cam will rotate when its respective dial is rotated, said cams being shaped so that one dimension will be proportional to the logarithm of the number appearing under the index on the associated dial, a variable resistance associated with each cam, means connecting said variable resistances to their associated cam in such a way that the resistance of said variable resistances is varied according to one dimension of said cam, said dimension being the same dimension which is proportional to the logarithm of the number appearing on the associated dial; means for adding said electrical quantities together; said adding means comprising a series electrical connection between said variable resistances and a source of voltage in series therewith; means for translating the sum of electrical quantities into the anti-logarithm of said sum, said translating means comprising a current indicating device connected in series with said variable resistances and said voltage source, with the dial of said current indicating device calibrated to read the anti-logarithm of the current flowing therethrough.

2. In a computing device for carrying out the mathematical operations of multiplication and division involving the algebraic addition of logarithms, the combination comprising means for setting in the numbers to be multiplied and/or divided; said setting in means comprising a mounting structure, a plurality of dials rotatably mounted thereon, said dials adapted to be rotated independently from each other and having numbers marked thereon at equally spaced intervals around the periphery thereof, and an index marking on said mounting structure adjacent to each of said dials; means for converting the set in numbers into electrical quantities whose values represent the logarithms of the set in numbers; said conversion means comprising a variable resistance element associated with each of said dials, said variable resistance elements constructed so that a movement in the movable portion thereof results in a change of resistance proportional to the logarithm of said movement, means connecting said variable resistance elements to said dials in such a manner that the resistance of said variable resistances will represent the logarithm of said numbers; means for adding said electrical quantities together; said adding means comprising a series electrical connection between said variable resistances and a source of voltage in series therewith; means for translating the sum of electrical quantities into the anti-logarithm of said sum; said translating means comprising a current indicating device connected in series with said variable resistances and said voltage source, with the dial of said current indicating device calibrated to read the anti-logarithm of the current flowing therethrough.

3. In a computing device for carrying out the operations of multiplication and division involving the addition of logarithms, the combination comprising means for setting in the numbers to be multiplied and/or divided; said setting in means comprising a mounting structure, a plurality of dials rotatably mounted thereon, said dials adapted to be rotated independently from each other and having numbers marked thereon at equally spaced intervals around the periphery thereof, and an index marking on said mounting structure adjacent to each of said dials; means for converting said numbers into electrical quantities whose values represent the logarithms of said numbers; said conversion means comprising a plurality of variable voltage dividers, one associated with each of said dials, said variable voltage divider consisting of a source of voltage and a variable resistance element, said voltage source connected in series with the fixed terminals of said variable resistance element, and means connecting the variable portion of said variable resistance element to the movable dial associated therewith in such a manner that the movable portion of the variable resistance is moved with the rotation of said movable dials, said variable resistance elements being constructed so that the voltage between said movable portion thereof and one of said fixed terminals thereof will represent the logarithm of said number on the dial associated therewith; means for adding said electrical quantities together, said adding means comprising series connections from the movable portion of a first of said resistance elements to a fixed terminal of a succeeding resistance element and from the movable portion of said succeeding resistance element to a fixed terminal of the next succeeding resistance element, and means for translating the sum of electrical quantities into the anti-logarithm of said sum comprising an electrical meter connected between a fixed terminal of said first resistance element and a movable portion of the last of said resistance elements with the dial of said meter calibrated to read the anti-logarithm of the voltage appearing at the terminals thereof.

References Cited in the file of this patent

UNITED STATES PATENTS

| | | |
|---|---|---|
| 1,573,850 | Naiman | Feb. 23, 1926 |
| 1,826,762 | Franklin | Oct. 13, 1931 |
| 1,893,009 | Ward | Jan. 3, 1933 |
| 2,244,369 | Martin | June 3, 1941 |
| 2,366,968 | Kaufman | Jan. 9, 1945 |

FOREIGN PATENTS

| | | |
|---|---|---|
| 650,084 | France | Jan. 4, 1929 |

OTHER REFERENCES

"Analog Methods in Computation and Simulation" (Soroka), 1954, McGraw-Hill Book Co., Inc., New York. Pages 131 and 132 relied on.

"An Electronic Slide Rule" (Kaufman et al.), Radio & Television News, December 1955 (pages 58, 59 and 78 relied on).